United States Patent
Suzuki et al.

(10) Patent No.: US 8,431,672 B2
(45) Date of Patent: Apr. 30, 2013

(54) METHOD FOR MANUFACTURING AN ISOCYANATE-TERMINATED PREPOLYMER, PREPOLYMER OBTAINED THEREBY, AND POLYURETHANE RESIN

(75) Inventors: Chitoshi Suzuki, Tokyo (JP); Takeaki Arai, Tokyo (JP); Yukio Matsumoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/435,204

(22) Filed: Mar. 30, 2012

(65) Prior Publication Data

US 2012/0184704 A1 Jul. 19, 2012

Related U.S. Application Data

(63) Continuation of application No. PCT/JP2010/066866, filed on Sep. 28, 2010.

(30) Foreign Application Priority Data

Sep. 30, 2009 (JP) ................. 2009-226162

(51) Int. Cl.
*C08G 18/48* (2006.01)
*C08G 18/10* (2006.01)
*C07C 269/02* (2006.01)
*C07C 271/06* (2006.01)

(52) U.S. Cl.
USPC ............... 528/59; 252/182.2; 252/182.21; 252/182.22; 528/76; 560/25; 560/26; 560/115; 560/158; 568/621

(58) Field of Classification Search ........... 252/182.2, 252/182.21, 182.22; 528/59, 76; 560/25, 560/26, 115, 158; 568/621
See application file for complete search history.

(56) References Cited

U.S. PATENT DOCUMENTS

| 5,416,241 A | * | 5/1995 | Ruszkay | .......... 568/621 |
| 5,627,120 A | * | 5/1997 | Le-Khac | .......... 502/156 |
| 6,036,879 A | * | 3/2000 | Lawrey et al. | .......... 252/182.24 |
| 2005/0267279 A1 | | 12/2005 | Suzuki et al. | |
| 2006/0167209 A1 | * | 7/2006 | Ostrowski et al. | .............. 528/85 |
| 2009/0203875 A1 | | 8/2009 | Suzuki et al. | |

FOREIGN PATENT DOCUMENTS

| JP | 3-88824 | | 4/1991 |
| JP | 3-122119 | | 5/1991 |
| JP | 05-097996 | * | 4/1993 |
| JP | 6-502674 | | 3/1994 |
| JP | 7-196778 | | 8/1995 |
| JP | 9-132630 | | 5/1997 |
| JP | 2000-513389 | | 10/2000 |
| JP | 2000-513647 | | 10/2000 |
| JP | 2003-165836 | | 6/2003 |
| JP | 2005-15786 | | 1/2005 |
| JP | 2006-526677 | | 11/2006 |
| WO | WO 92/07892 A1 | | 5/1992 |
| WO | WO 97/23544 A1 | | 7/1997 |
| WO | WO 97/26080 A1 | | 7/1997 |
| WO | WO 2004/067633 A1 | | 8/2004 |
| WO | WO 2004/106408 A1 | | 12/2004 |
| WO | WO 2008/026657 A1 | | 3/2008 |

OTHER PUBLICATIONS

International Search Report issued Jan. 18, 2011, in PCT/JP2010/066866 (with English-language translation).

* cited by examiner

*Primary Examiner* — Rabon Sergent
(74) *Attorney, Agent, or Firm* — Oblon, Spivak, McClelland, Maier & Neustadt, L.L.P.

(57) ABSTRACT

The present invention relates to a method for manufacturing an isocyanate group-terminated prepolymer, comprising the following steps (a) to (d): (a) a step of ring-opening polymerizing an alkyleneoxide-containing cyclic compound by using an initiator in the presence of a composite metal cyanide complex catalyst, thereby obtaining a polyol composition containing the catalyst; (b) a step of, without removal of the composite metal cyanide complex catalyst from the polyol composition obtained in the step (a), adding water and performing a heat treatment in a closed system; (c) a step of subjecting the hydrous polyol composition after the step (b) to a dehydration treatment; and (d) a step of adding a polyisocyanate compound to the polyol composition after the step (c) and subjecting to a reaction with the polyol in the polyol composition.

13 Claims, No Drawings

METHOD FOR MANUFACTURING AN ISOCYANATE-TERMINATED PREPOLYMER, PREPOLYMER OBTAINED THEREBY, AND POLYURETHANE RESIN

TECHNICAL FIELD

The present invention relates to a method for manufacturing an isocyanate group-terminated prepolymer excellent in storage stability using a polyol produced with use of a composite metal cyanide complex catalyst, an isocyanate group-terminated prepolymer obtained by the manufacturing method, and a polyurethane resin.

BACKGROUND ART

Conventionally, there is known a method for producing a polyurethane resin by reacting a curing agent with an isocyanate group-terminated prepolymer which is obtained by reacting a polyoxyalkylene polyol such as polyoxytetramethylene diol and polyoxypropylene polyol, or a high-molecular-weight polyol such as polyester polyol, with an isocyanate compound.

The high-molecular-weight polyol has been heretofore produced by polymerizing an alkyleneoxide such as ethyleneoxide and propyleneoxide, with an active hydrogen-containing initiator in the presence of a catalyst. As the catalyst, many catalysts are known. For example, as the catalyst used for obtaining a polyoxyalkylene polyol having a small degree of total unsaturation, catalysts such as composite metal cyanide complex catalysts (hereinafter, sometimes referred to as a "DMC catalyst" as needed), cesium-based catalysts, metalloporphyrin catalysts and phosphazene catalysts are known. Above all, the DMC catalyst can be used in a small amount because of its high catalytic activity and in turn, is free of the need to remove the catalyst residue after the polymerization reaction and therefore, this is known as a preferred catalyst for obtaining a polyoxyalkylene polyol where the degree of total unsaturation of the final product polyol is small (Patent Document 1). However, when the polyether polyol produced using a composite metal cyanide complex catalyst is used for the manufacture of an isocyanate group-terminated prepolymer without removing the catalyst residue, the obtained prepolymer may suffer from a problem that, for example, storage stability becomes bad due to the presence of the catalyst residue and the viscosity rises during storage, making the handling difficult. To cope with this problem, a method for deactivating or removing the catalyst residue is being studied.

For example, there have been proposed a purification method of deactivating the DMC catalyst residue in the produced polyether polyol by a heat treatment in the presence or absence of water, treating it with an adsorbent or the like, if desired, and then performing filtration (Patent Document 2); a purification method of water-treating the produced polyether polyol containing a DMC catalyst residue, and after dehydration and addition of a treating agent such as metal, removing the deactivation catalyst, the treating agent and the like (Patent Document 3); and a purification method of subjecting the DMC catalyst residue in the produced polyether polyol to alkali decomposition, subsequently to phosphoric acid neutralization and then to removal by an absorbent (Patent Document 4). However, these methods have a problem that the isocyanate group-terminated prepolymer manufactured using the obtained polyether polyol is insufficient in storage stability or requires a very cumbersome purification operation.

In Patent Document 5, it is stated that a polyether polyol containing from 10 to 1,000 ppm by mass of a DMC catalyst residue has storage stability and storage stability is reasonably ensured also in the isocyanate group-terminated prepolymer using the polyether polyol. This document demonstrates that storage stability was maintained for a relatively short period of time under specific conditions. However, storage stability under normal conditions to which the polyol product is exposed is insufficient, and more improvement of storage stability is keenly demanded. Furthermore, in Patent Document 6, it has been proposed to produce an isocyanate group-terminated prepolymer by using a polyether polyol composition in which from 0.5 to 100 ppm by mass of a phosphoric acid compound is added to an unpurified polyether polyol containing from 1 to 30 ppm by mass of a DMC catalyst, and thereby improve storage stability. However, since a small amount of a phosphoric acid compound is used as an additive, there is still a problem that the operation such as control of the amount added is cumbersome.

On the other hand, for the purpose of achieving deodorization by volatilizing a low-molecular-weight odorous component from the polyether-ol manufactured using a composite metal cyanide complex catalyst, a purification method where an alkyleneoxide is polymerized in the presence of a DMC catalyst and the unpurified polyether-ol is further treated with water vapor in the presence of an acid, preferably, immediately after the completion of polymerization, has been proposed (Patent Document 7). However, this proposal is utterly different in the purpose from the present invention and moreover, requires a large-capacity energy and a coagulator for the supply of water vapor over a long period of time.

PRIOR ART DOCUMENT

Patent Document
Patent Document 1: JP-T-2000-513389
Patent Document 2: JP-A-3-88824
Patent Document 3: JP-A-3-122119
Patent Document 4: JP-T-6-502674
Patent Document 5: JP-A-9-132630
Patent Document 6: WO 2004/067633
Patent Document 7: JP-T-2006-526677

SUMMARY OF THE INVENTION

Problems that the Invention is to Solve

The present invention has been made to solve the above-described problems, and an object of the present invention is to provide a method for manufacturing an isocyanate group-terminated polymer excellent in storage stability by a simple operation without performing removal of a composite metal cyanide complex catalyst used for the production of the raw material polyol or performing a cumbersome treatment such as addition of a phosphoric acid compound or the like, and an isocyanate group-terminated prepolymer excellent in storage stability. Another object of the present invention is to provide a high-quality polyurethane resin using the isocyanate group-terminated prepolymer.

Means for Solving the Problems

The present invention provides a method for manufacturing an isocyanate group-terminated prepolymer, comprising the following steps (a) to (d):

(a) a step of ring-opening polymerizing an alkyleneoxide-containing cyclic compound by using an initiator in the presence of a composite metal cyanide complex catalyst in such an amount that the amount of a metal derived from the composite metal cyanide complex catalyst becomes from 1 to 30 ppm by mass based on the final product polyol, thereby obtaining a polyol composition containing the catalyst;

(b) a step of, without removal of the composite metal cyanide complex catalyst from the polyol composition obtained in the step (a), adding water in an amount of 0.05 to 20% by mass based on the polyol composition and performing a heat treatment in a closed system;

(c) a step of subjecting the hydrous polyol composition after the step (b) to a dehydration treatment until the water content in the composition becomes from 5 to 500 ppm by mass; and (d) a step of adding a polyisocyanate compound to the polyol composition after the step (c) and subjecting to a reaction with the polyol in the polyol composition.

The present invention also provides an isocyanate group-terminated prepolymer obtained by the above manufacturing method.

The present invention further provides a polyurethane resin obtained by reacting the above isocyanate group-terminated prepolymer with a curing agent.

Advantage of the Invention

According to the present invention, an isocyanate group-terminated polymer excellent in storage stability can be manufactured by a simple operation without performing removal of a composite metal cyanide complex catalyst used for the production of the raw material polyol or performing a cumbersome treatment such as addition of a phosphoric acid compound or the like. The isocyanate group-terminated prepolymer obtained by the method of the present invention is excellent in storage stability, and its use ensures the raw material quality, so that a high-quality polyurethane resin can be obtained.

MODE FOR CARRYING OUT THE INVENTION

The mode for carrying out the present invention is described below.

Method for Manufacturing Isocyanate Group-Terminated Prepolymer of the Present Invention (a) Step of Producing Polyol in the Presence of Composite Metal Cyanide Complex Catalyst In the method for manufacturing an isocyanate group-terminated prepolymer of the present invention, first, an alkyleneoxide-containing cyclic compound is subjected to a ring-opening polymerization by using an initiator in the presence of a composite metal cyanide complex catalyst in such an amount that the amount of the metal derived from the composite metal cyanide complex catalyst becomes from 1 to 30 ppm by mass based on the final product polyol to produce a polyol, whereby a polyol composition containing the catalyst is obtained.

(Composite Metal Cyanide Complex Catalyst)

The composite metal cyanide complex catalyst for use in the manufacturing method of the present invention typically includes a compound represented by the following formula (1):

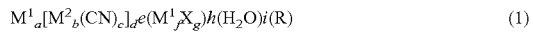

(wherein each of $M^1$ and $M^2$ represents a metal, X represents a halogen atom, R represents an organic ligand, and each of a, b, c, d, e, f, g, h and i represents a number of 0 or more which is variable depending on, for example, the atomic valence of the metal or the coordination number of the organic ligand).

In formula (1), the metal represented by $M^1$ is preferably a metal selected from Zn(II), Fe(II), Fe(III), Co(II), Ni(II), Mo(IV), Mo(VI), Al(III), V(V), Sr(II), W(IV), W(VI), Mn(II), Cr(III), Cu(II), Sn(II) and Pb(II), and more preferably Zn(II) or Fe(II). In formula (1), the metal represented by $M^2$ is preferably a metal selected from Fe(II), Fe(III), Co(II), Co(III), Cr(II), Cr(III), Mn(II), Mn(III), Ni(II), V(IV) and V(V), and more preferably Co(III) or Fe(III). Incidentally, II, III, IV, V or the like in the parenthesis following the element symbol of the metal indicates the atomic valence of the metal.

In formula (1), R representing an organic ligand is preferably at least one compound selected from the group consisting of alcohols, ethers, ketones, esters, amines and amides. In the manufacturing method of the present invention, among these, a water-soluble compound is preferred as the organic ligand R, and specific examples thereof include one or two or more compounds selected from tert-butyl alcohol, n-butyl alcohol, iso-butyl alcohol, tert-pentyl alcohol, iso-pentyl alcohol, N,N-dimethylacetamide, glyme (ethyleneglycol dimethylether), diglyme (diethyleneglycol dimethylether), triglyme (triethyleneglycol dimethylether), ethyleneglycol mono-tert-butylether, iso-propyl alcohol and dioxane. The dioxane may be either 1,4-dioxane or 1,3-dioxane and is preferably 1,4-dioxane.

In the DMC catalyst for use in the manufacturing method of the present invention, the organic ligand is more preferably one or two or more compounds selected from tert-butyl alcohol, tert-pentyl alcohol and ethyleneglycol mono-tert-butylether, still more preferably tert-butyl alcohol or a mixture of tert-butyl alcohol and ethyleneglycol mono-tert-butylether, and most preferably tert-butyl alcohol. That is, it is preferred to use a composite metal cyanide complex catalyst having tert-butyl alcohol as at least a part of the organic ligand(s). When such an organic ligand is used, the activity of the composite metal cyanide complex catalyst becomes higher and at the polymerization addition of an alkyleneoxide, production of the monool having an unsaturated bond can be suppressed, for example, such that the degree of total unsaturation becomes 0.009 or less.

The composite metal cyanide complex catalyst can be produced by a conventionally known production method, for example, the method described in JP-A-2003-165836, JP-A-2005-15786, JP-A-7-196778, or JP-T-2000-513647. More specifically, the catalyst can be produced, for example, by (i) a method of coordinating an organic ligand to a reaction product obtained by reacting a metal halide salt with an alkali metal cyanometalate in an aqueous solution, subsequently separating the solid component, and further washing the separated solid component with an aqueous organic ligand solution, or (ii) a method of reacting a metal halide salt with an alkali metal cyanometalate in an aqueous organic ligand solution, separating the obtained reaction product (solid component), and further washing the separated solid component with an aqueous organic ligand solution. It is also possible to prepare a slurried composite metal cyanide complex catalyst by re-dispersing a cake (solid component) obtained through washing and filtration-separation of the reaction product into an aqueous organic ligand solution containing a polyol in an amount of 3% by mass or less based on the cake and thereafter, removing the volatile component by distillation.

In the case of using a slurried composite metal cyanide complex catalyst, the polyol contained in the slurry acts as a part of the initiator when producing a polyol for the manufacture of the below-described isocyanate group-terminate prepolymer and therefore, the polyol used to prepare the slurry is preferably the same as the polyol employed as the initiator. For producing a polyoxyalkylene polyol or the like having a narrow molecular weight distribution, use of this slurried DMC catalyst is particularly preferred.

In the manufacturing method of the present invention, the amount of the composite metal cyanide complex catalyst used in the (a) production step of a polyol is such an amount that the metal derived from the composite metal cyanide complex catalyst accounts for 1 to 30 ppm by mass, preferably from 2 to 20 ppm by mass, and more preferably from 3 to 15 ppm by mass, based on the final product polyol. The final product polyol indicates the polyol at the completion of polymerization and does not include the polyol used as the initiator in the course of producing a polyol.

If the composite metal cyanide complex catalyst is used in an amount exceeding 30 ppm by mass in terms of the amount of the metal derived from the composite metal cyanide complex catalyst based on the final product polyol, the catalyst cost rises, and unless the reaction activity of the DMC catalyst with polyol and isocyanate is deactivated under strict conditions, insufficient deactivation of the DMC catalyst is liable to result. Insufficient deactivation of the DMC catalyst makes it difficult to control the reaction when manufacturing an isocyanate group-terminated prepolymer or a polyurethane from the polyol. Furthermore, stability of the isocyanate group-terminated prepolymer obtained from the polyol is deteriorated and this adversely affects the mechanical properties of the polyurethane. Also, if the amount of the composite metal cyanide complex catalyst used is less than 1 ppm by mass in terms of the amount of the metal derived from the composite meal cyanide complex catalyst based on the final product polyol, the viscosity of the final product polyol is extremely increased, making its handling difficult.

(Initiator and Alkyleneoxide-Containing Cyclic Compound)

As the initiator for use in the manufacturing method of the present invention, initiators having an active hydrogen atom, which are usually employed when producing a polyol by ring-opening polymerizing an alkyleneoxide or the like in the presence of a composite metal cyanide complex catalyst, can be used without any particular limitation.

Specific examples of the initiator include a polyhydric alcohol such as ethylene glycol, propylene glycol, diethylene glycol, dipropylene glycol, trimethylolpropane, glycerin, pentaerythritol, dipentaerythritol, sorbitol, tripentaerythritol and sucrose, and a polyether monool or polyether polyol produced by ring-opening polymerizing such a polyhydric alcohol with an alkyleneoxide by using an alkali catalyst or a cationic catalyst.

The number of hydroxyl group contained in such an initiator is preferably from 2 to 12, more preferably from 2 to 8, and still more preferably from 2 to 3. The number average molecular weight (Mn) of the initiator is preferably from 300 to 5,000, and more preferably from 600 to 3,000. The hydroxyl value of the initiator is preferably 2 times or more, and more preferably 3 times more, the hydroxyl value of the final product polyol. As the initiator, a polyester polyol or a polycarbonate polyol can be also used.

The number average molecular weight (Mn) as used in the present description is a molecular weight in terms of polystyrene as measured by gel permeation chromatography (GPC). Also, the hydroxyl value indicates the milligram number of potassium hydroxide equivalent to the hydroxyl group in 1 g of a sample and can be measured in accordance with the measuring method of JIS K1557-1 (2007).

In the manufacturing method of the present invention, the amount of the initiator used in the (a) production step of a polyol varies depending on the kind or molecular weight of the initiator, the molecular weight of the alkyleneoxide-containing cyclic compound subjected to ring-opening addition polymerization or the objective final product polyol, or the shape of the polymerization reaction vessel but can be easily determined by one skilled in the art. The amount is usually from 3 to 70% by volume, preferably from 5 to 50% by volume, and more preferably from 5 to 30% by volume, based on the volume of the reaction vessel. Incidentally, in the case where the DMC catalyst contains a polyol acting as the initiator, the amount used of the initiator is an amount including this polyol.

The alkyleneoxide-containing cyclic compound that is ring-opening addition polymerized with the initiator in the presence of the composite metal cyanide complex catalyst may be composed of only an alkyleneoxide or as long as the compound contains an alkyleneoxide, may contain an alkyleneoxide and a cyclic compound except for an alkyleneoxide.

Examples of the alkyleneoxide include ethyleneoxide, propyleneoxide, 1,2-butyleneoxide, 2,3-butyleneoxide, epichlorohydrin, styreneoxide and cyclohexeneoxide. One of these can be used alone, or two or more thereof can be used in combination. Among these, in the manufacturing method of the present invention, propyleneoxide is preferred. The ethyleneoxide is hardly reacted by itself but can be polymerized by blending it with an alkyleneoxide having a carbon number of 3 or more and adding to the polymerization system. In the present invention, the alkyleneoxide is still preferably propyleneoxide or a combination of propyleneoxide and ethyleneoxide.

Examples of the cyclic compound except for an alkyleneoxide, which is used, if desired, together with the above-described alkyleneoxide in the manufacturing method of the present invention, include oxetanes, cyclic lactones, polyvalent carboxylic anhydrides, cyclic carbonates and cyclic esters. Examples of the oxetanes include oxetane and substituted oxetanes such as dimethyloxetane. Examples of the cyclic lactones include β-propiolactone, δ-valerolactone, ε-caprolactone, and methyl-ε-caprolactone. Examples of the polyhydric carboxylic anhydrides include phthalic anhydride and maleic anhydride. Examples of the cyclic carbonates include neopentyl carbonate. Examples of the cyclic esters include lactide. In the manufacturing method of the present invention, the cyclic compound except for an alkyleneoxide can be used in an amount of 1 to 95% by mass, preferably from 5 to 80% by mass, and more preferably from 10 to 70% by mass, based on the alkyleneoxide.

The amount of the alkyleneoxide-containing cyclic compound used for the production of the polyol varies depending on the kind of the alkyleneoxide or the like used or the molecular weight of the initiator used or the objective final product polyol but can be easily determined by one skilled in the art. The amount is, by mass, usually from 0.5 to 20 times, preferably from 1 to 15 times, and more preferably from 2 to 10 times, the amount of the initiator.

(Production of Polyol)

In the step (a) of the manufacturing method of the present invention, the alkyleneoxide-containing cyclic compound is ring-opening addition polymerized with the initiator in the presence of the above-described composite metal cyanide complex catalyst, whereby a polyol is produced. Specific examples of the polyol produced include a polyether polyol when the initiator is a polyether polyol, a polyester ether polyol when the initiator is a polyester polyol, and a polycarbonate ether polyol when the initiator is a polycarbonate polyol.

The polyol obtained in the step (a) of the present invention is preferably a polyol where the number of hydroxyl group is from 2 to 12, more preferably from 2 to 8, and still more preferably from 2 to 3. The number of hydroxyl group can be determined by the number of hydroxyl group in the initiator. Also, the hydroxyl value (mgKOH/g) of the polyol produced from the initiator and the alkyleneoxide-containing cyclic compound in the step (a) is preferably from 500 to 5, more preferably from 300 to 7, and still more preferably from 100 to 10. The number average molecular weight (Mn) of the polyol obtained is preferably from 500 to 20,000, more preferably from 800 to 15,000, and still more preferably from 1,000 to 10,000.

The final product polyol to which the manufacturing method of the present invention is preferably applied is a polyether polyol obtained by using a low-molecular-weight polyether polyol as the initiator and ring-opening polymerizing an alkyleneoxide therewith. The number of hydroxyl group in such a polyether polyol can be determined, as described above, by the initiator used when producing the polyether polyol. The final product polyol to which the manufacturing method of the present invention is applied is preferably a polyol where the degree of total unsaturation correlated with the amount of the monool in the final product polyol is preferably from 0.003 to 0.030 meq/g. The degree of total unsaturation is more preferably from 0.003 to 0.009 meq/g, and still more preferably from 0.003 to 0.006 meq/g.

The step (a) in the manufacturing method of the present invention is performed by ring-opening addition polymerizing a predetermined amount of an alkyleneoxide-containing cyclic compound with a predetermined amount of an initiator in the presence of the above-described composite metal cyanide complex catalyst in such an amount that the metal derived from the composite metal cyanide complex catalyst present in the final product polyol composition after the completion of polymerization accounts for 1 to 30 ppm by mass based on the final product polyol. The ring-opening polymerization can be performed batchwise or continuously by using a reaction vessel usually employed for the polyol production using a DMC catalyst. In the manufacturing method of the present invention, introduction of the alkyleneoxide-containing cyclic compound into the reaction vessel is preferably performed continuously, but the initiator and the DMC catalyst may be introduced at a time at the start of polymerization or may be continuously introduced into the reaction vessel together with the alkyleneoxide-containing cyclic compound.

The reaction temperature in the polyol production of the step (a) is appropriately selected depending on the shape or cooling capacity of the polymerization reaction vessel, the kind of the alkyleneoxide, the amount or molecular weight of the polyol produced, and the like but usually, preferably from 80 to 170° C., more preferably from 90 to 160° C., and still more preferably from 100 to 150° C. In this case, the reaction time is usually an average residence time of 1 to 15 hours in the batch system and the continuous system. At the reaction to produce a polyol in the step (a), stirring can be also performed and is preferably performed appropriately as needed. As for the atmosphere during reaction to produce a polyol, nitrogen purging or the like can be appropriately performed and is preferably performed.

In this way, a polyol is produced in the step (a) of the present invention. In the manufacturing method of the present invention, after the completion of polymerization of the alkyleneoxide-containing cyclic compound, the product is used for the subsequent step without removing the composite metal cyanide complex catalyst charged for the polymerization. That is, the polyol composition is used for the subsequent step in the state of containing the composite metal cyanide complex catalyst still in the amount charged in the initial stage of polyol polymerization, specifically, in the state of containing the DMC catalyst in a concentration of, in terms of the amount of the metal derived from the composite metal cyanide complex catalyst, from 1 to 30 ppm by mass, preferably from 2 to 20 ppm by mass, and more preferably from 3 to 15 ppm by mass, based on the final product polyol. Here, the amount of the metal derived from the composite metal cyanide complex catalyst is, for example, the total amount of $M^1$ and $M^2$ in formula (1). The metal includes the above-described metals and specifically, for example, in the case where the DMC catalyst is a zinc hexacyanocobaltate complex, the amount indicates the total amount of zinc and cobalt.

(b) Step of Heat-Treating Polyol Composition After Step (a) in the Presence of Water In the manufacturing method of the present invention, in the step (b) performed subsequently to the step (a), without removing the DMC catalyst, water is added to the polyol composition containing a polyol and the DMC catalyst obtained in the step (a), in an amount of 0.05 to 20% by mass based on the polyol composition, and a heat treatment is performed in a closed system. However, the step (b) need not be performed immediately after the completion of polymerization of the step (a), and it is also possible to partially store the required amount of the unpurified polyol, that is, the polyol composition containing the above-described DMC catalyst in the above-described amount and at a later date, subject the polyol composition to the (b) step of performing a heat treatment in the presence of water and then, to (c) a dehydration step and (d) a step of producing an isocyanate group-terminated prepolymer, which are described later.

The amount of water added to the polyol composition in the step (b) is from 0.05 to 20% by mass, preferably from 0.1 to 5% by mass, and more preferably from 0.5 to 3% by mass, based on the polyol composition. If the amount of water added is less than 0.05% by mass based on the polyol composition, the isocyanate reaction activity of the DMC catalyst cannot be sufficiently deactivated and also, the heat treatment takes a long time, whereas if the amount added exceeds 20% by mass, although deactivation of the isocyanate reaction activity may be facilitated, there arise a problem that the energy cost rises in the later dehydration treatment.

The heat treatment of the hydrous polyol composition obtained by adding water in the step (b) is performed in a closed system under heating, if desired, by adding a stirring operation. The heating temperature is preferably a temperature condition of 50 to 140° C., more preferably from 60 to 120° C., and still more preferably from 80 to 100° C. The heating time is preferably from 10 minutes to 6 hours, more preferably from 30 minutes to 4 hours, and still more preferably from 1 to 3 hours.

The heat treatment after the addition of water to the polyol composition can be also performed by contacting a $CO_2$ gas with the composition in a closed system under the same temperature, time and stirring conditions as above, and this is preferred in the present invention. In this case, the $CO_2$ gas partial pressure is preferably from 0.01 to 5 MPa, more preferably from 0.05 to 2 MPa, and still more preferably from 0.1 to 1 MPa. The closed system as used in the present invention indicates a state of being treated to allow for no outside leakage of the volatile component from the reaction tank.

The heat treatment in a closed system requires no removal of the volatile component and prevents evaporation of water and therefore, the treatment can be performed in a closed stirring reaction vessel. For returning the volatile component to the polyol composition, a reaction vessel equipped with a reflux device may be also used.

In the manufacturing method of the present invention, by the heat treatment in the presence of water in the step (b), the action of the DMC catalyst present in the polyol composition to account for 1 to 30 ppm by mass in terms of the amount of the metal derived from the composite metal cyanide complex catalyst based on the polyol can be suppressed. That is, the action of the composite metal cyanide complex catalyst to accelerate the gelling reaction of the later-described isocyanate group-terminated prepolymer can be deactivated. The heat treatment in the presence of water of the present invention differs in the conditions and purpose from the conventional heat treatment preformed in the presence of water for deactivation of the polymerization activity of the DMC catalyst and/or polyol purification. Thanks to this deactivation of the DMC catalyst, in the manufacturing method of the present invention, even when production of an isocyanate group-terminated prepolymer is performed by not removing the DMC catalyst charged in the step (a) until the completion of the final step (d), the obtained isocyanate group-terminated prepolymer can have excellent storage stability. Hereinafter, the DMC catalyst in such a state after the step (b) is referred to as a "deactivated DMC catalyst". Incidentally, in the manufacturing method of the present invention, after the completion of the step (b), the following dehydration step (c) is performed before producing an isocyanate group-terminated prepolymer by using the polyol composition containing the deactivated DMC catalyst.

(c) Step of Subjecting Hydrous Polyol Composition after Step (B) to Dehydration Treatment In the manufacturing method of the present invention, in the step (c) performed subsequently to the step (b), the hydrous polyol composition after the step (b) is subjected to a dehydration treatment until the water content in the composition becomes from 5 to 500 ppm by mass. The water content in the composition after the dehydration treatment is preferably from 8 to 300 ppm by mass, and more preferably from 10 to 150 ppm by mass. The water content after the dehydration treatment is preferably smaller. However, for reducing the water content in the composition after the dehydration treatment to less than 5 ppm by mass, the energy cost becomes excessively high, whereas if the water content exceeds 500 ppm by mass, the reaction product of isocyanate and water is increased and the target urethane resin cannot be obtained.

The dehydration treatment is not particularly limited as long as it is a treatment capable of reducing the water content in the composition after the treatment to the range above. Specifically, it is preferred to practice any one treatment of heating, flowing of nitrogen gas into the hydrous polyol composition, and pressure reduction, or practice a combination of two or more thereof at the same time. The heating temperature is preferably from 50 to 150° C., more preferably from 60 to 140° C., and still more preferably from 80 to 130° C. The pressure is usually an absolute pressure of 50 to 66,000 Pa, preferably from 100 to 13,000 Pa, and more preferably from 100 to 6,000 Pa. The time spent for dehydration under reduced pressure is usually from 0.5 to 6 hours, and preferably from 1 to 3 hours. The polyol composition obtained in the step (c) is a polyol composition containing the deactivated DMC catalyst in an amount of 1 to 30 ppm by mass in terms of the amount of the metal derived from the composite metal cyanide complex catalyst based on the polyol in the composition and water in an amount of 5 to 500 ppm by mass based on the composition. In the manufacturing method of the present invention, subsequently, an isocyanate group-terminated prepolymer is produced in the step (d) by using the polyol composition after the completion of the step (c).

(d) Step of Producing Isocyanate Group-terminated Prepolymer

In the manufacturing method of the present invention, in the step (d) performed subsequently to the step (c), a polyisocyanate compound is added to the polyol composition after the step (c) and reacted with the polyol in the polyol composition to produce an isocyanate group-terminated prepolymer.

In the manufacturing method of the present invention, specific examples of the polyisocyanate compound reacted with the polyol include an aromatic polyisocyanate such as diphenylmethane diisocyanate, polyphenylene polymethylene polyisocyanate, 2,4-tolylene diisocyanate, 2,6-tolylene diisocyanate, and xylene diisocyanate, an aliphatic polyisocyanate such as hexamethylene diisocyanate, an alicyclic polyisocyanate such as isophorone diisocyanate and 4,4'-methylene bis(cyclohexylisocyanate), and urethane-modified, biuret-modified, allophanate-modified, carbodiimide-modified and isocyanurate-modified products of the polyisocyanate above. These polyisocyanate compounds may be used alone, or as a mixture of two or more thereof. In view of the reactivity and the viscosity of the isocyanate group-terminated prepolymer obtained, an aromatic diisocyanate is preferred, and diphenylmethane diisocyanate is more preferred.

In the manufacturing method of the present invention, if desired, a commercial product may be also used as the polyisocyanate compound. Specific examples of the commercial product include tolylene diisocyanate (an isomer mixture of 2,4-form and 2,6-form, containing 80% by mass of 2,4-form, trade name: TDI-80, produced by Nippon Polyurethane Industry Co., Ltd.) and 4,4'-diphenylmethane diisocyanate (trade name: Millionate MT, produced by Nippon Polyurethane Industry Co., Ltd.).

The isocyanate group-terminated prepolymer can be produced by using the polyol composition obtained in the step (c) and a polyisocyanate compound and reacting the polyol contained in the composition with the polyisocyanate compound in a ratio such that the isocyanate group/hydroxyl group (molar ratio) becomes preferably from 1.8 to 10 and more preferably from 1.9 to 6. If the molar ratio of isocyanate group/hydroxyl group is less than 1.8, the prepolymer is likely to have a high viscosity to impair workability, whereas if the molar ratio exceeds 10, the prepolymer is liable to be foamed.

The isocyanate group content of the obtained isocyanate group-terminated prepolymer is, by mass, preferably from 0.1 to 10% by mass, more preferably from 0.3 to 6.0% by mass, and most preferably from 2 to 4% by mass. If the isocyanate group content is less than 0.1% by mass, the prepolymer is likely to have a high viscosity to impair the workability, whereas if the isocyanate group content exceeds 10% by mass, the prepolymer is liable to be foamed.

In the manufacturing method of the present invention, in the step (d), another polyol produced using a catalyst except for a DMC catalyst can be used in combination, in addition to the above-described polyol composition produced using a composite metal cyanide complex catalyst. Another polyol includes a polyol having a relatively high degree of total unsaturation. In the case of using another polyol in combination, the use ratio thereof is, as the mass ratio of polyols, preferably a ratio such that the polyol produced using a DMC catalyst/another polyol becomes from 10/90 to 90/10, and more preferably from 40/60 to 90/10.

For producing an isocyanate group-terminated prepolymer by the reaction of a polyol and a polyisocyanate compound, conventionally known reaction conditions can be employed without any particular limitation. For example, the prepolymer can be produced by heat-reacting the polyol composition obtained in the step (c) and a polyisocyanate compound under a dry nitrogen flow in the presence or absence of a solvent optionally in the presence of a catalyst for polymerizing polyurethane at 60 to 100° C. for 1 to 20 hours. The completion of the reaction can be confirmed, for example, by measuring the isocyanate group content in the reaction solution with age to check the degree of progress of the reaction. As the solvent used for the reaction above, a water-soluble polar solvent such as dimethylformamide, dimethylacetamide and dimethylsulfoxide is preferably used.

The amount of the solvent used is preferably from 5 to 50% by mass based on the polyol used.

Examples of the catalyst for polymerizing polyurethane for use in the reaction above include organic tin compounds such as dibutyltin dilaurate, dioctyltin dilaurate, dibutyltin dioctoate and tin 2-ethylhexanoate; iron compounds such as iron acetylacetonate and ferric chloride; and tertiary amine systems such as triethylamine and triethylenediamine. Among these, an organic tin compound is preferred. The amount of the catalyst for polymerizing polyurethane used is preferably from 0.0001 to 0.1 parts by mass per 100 parts by mass of the total of polyol and isocyanate.

The isocyanate group-terminated prepolymer thus obtained in the step (d) by using the polyol composition obtained in the step (c) containing a deactivated DMC catalyst in an amount of 1 to 30 ppm by mass in terms of the amount of the metal derived from the composite metal cyanide complex catalyst based on the polyol in the composition and water in an amount of 5 to 500 ppm by mass based on the composition, is excellent in storage stability, because even if the DMC catalyst is not removed but is contained, the activity of the DMC catalyst is lost. Heretofore, the polyol composition containing a composite metal cyanide complex catalyst even in a small amount exhibits high reactivity with an isocyanate and has a problem that the reaction rate can be hardly controlled. There is also a problem that when this polyol composition is reacted with a polyisocyanate compound to produce an isocyanate group-terminated prepolymer, gelling of the isocyanate group-terminated prepolymer is readily caused by the action of the composite metal cyanide complex catalyst and therefore, the isocyanate group-terminated prepolymer suffers from poor storage stability. In the manufacturing method of the present invention, the above-described activity of the composite metal cyanide complex catalyst contained in the polyol composition is deactivated in the step (b), whereby the problem in storage stability is solved. The action mechanism of the step (b) is not elucidated in detail, but it is considered that the composite metal cyanide complex catalyst is hydrolyzed with water and this changes the composite metal cyanide complex catalyst into a compound not having a catalytic activity for polymerizing polyurethane.

[2] Polyurethane Resin of the Present Invention

The present invention also provides a polyurethane resin produced by reacting a curing agent with the isocyanate group-terminated prepolymer obtained by the reaction between the polyol in the polyol composition above and a polyisocyanate compound.

The curing agent used for the reaction with the isocyanate group-terminated prepolymer can be appropriately selected from high-molecular-weight polyols (preferably having a hydroxyl value of 5 to 112 mgKOH/g), a low-molecular-weight polyol, a polyamide and the like, depending on the properties required for the polyurethane resin that is a final product.

In the case of shape-forming the polyurethane resin obtained by reacting a curing agent with the isocyanate group-terminated prepolymer, there is a method of shape-forming the resin by using a mold such as a metal mold. Examples of this shape-forming method include a method containing reacting the isocyanate group-terminated prepolymer and a curing agent at 0 to 130° C., casting the polyurethane resin obtained into a mold and curing it at 60 to 200° C. for 2 to 24 hours, and thereafter, drawing the polyurethane resin out from the mold, and post-curing it at 60 to 150° C. for 4 hours to 1 week.

As the low-molecular-weight polyol, for example, a low-molecular-weight polyol having a molecular weight of 500 or less can be used. Examples of the low-molecular-weight polyol include a divalent alcohol such as ethyleneglycol, diethyleneglycol, 1,2-propanediol, 1,3-propanediol, 1,6-hexanediol, 2-methyl-1,3-propanediol, 2,2-dimethyl-1,3-propanediol, 2-methyl-1,5-heptanediol, and cyclohexane-1,4-dimethanol.

The polyamine specifically includes aromatic diamine compounds where an amino group is directly bonded on an aromatic ring, diamine compounds where an amino group is bonded on an aromatic ring through an alkylene group, aliphatic amines, and alicyclic amines. More specifically, examples thereof include aromatic amines such as diaminobenzene, 2,4-diaminotoluene, 2,6-diaminotoluene, 4,4'-diaminodiphenylmethane, 3,3'-dimethyl-4,4'-diaminodiphenylmethane, 3,3'-diethyl-4,4'-diaminodiphenylmethane, 3,5-diethyl-2,4-diaminotoluene, 3,5-diethyl-2,6-diaminotoluene, m-xylylenediamine and p-xylylenediamine, aliphatic diamines such as ethylenediamine, propylenediamine and isophoronediamine, and alicyclic diamines such as piperazine and piperazine derivative.

When reacting the isocyanate group-terminated prepolymer and the curing agent, the ratio of these two members is preferably a ratio such that the active hydrogen-containing group in the curing agent/the isocyanate group in the isocyanate group-terminated prepolymer becomes from 0.7 to 1.2, and more preferably from 0.85 to 1.05. The reaction temperature is preferably from 0 to 130° C., more preferably from 40 to 100° C., and still more preferably from 60 to 90° C. If the reaction temperature is less than 0° C., the reaction proceeds too slowly and a long time (1 day or more) is required until it becomes possible to enter the next step. If the reaction temperature exceeds 130° C., too fast reaction takes place and the reaction may proceed in a non-uniform state before achieving a thoroughly mixed state.

In the reaction of the isocyanate group-terminated prepolymer with a curing agent, the same known catalyst for polymerizing polyurethane as exemplified in the step (d) of [1] above can be used. The amount of the catalyst for polymerizing polyurethane added is preferably from 0.0001 to 0.1 parts by mass, and more preferably from 0.001 to 0.01 parts by mass, per 100 parts by mass of the total of the isocyanate group-terminated prepolymer and the curing agent. If the amount of the catalyst for polymerizing polyurethane added is less than 0.0001 parts by mass, a long time is required until the shape-formed article produced using the obtained polyurethane resin can be demolded, whereas if the amount added exceeds 0.1 parts by mass, the pot life after mixing the reaction components may become short.

The reaction of the isocyanate group-terminated prepolymer with a curing agent can be performed in a solvent. For example, the isocyanate group-terminated prepolymer is produced in a solvent described in the step (d) of [1] above and a curing agent is added to the obtained isocyanate group-terminated prepolymer solution, whereby the reaction of the isocyanate group-terminated prepolymer with a curing agent can be performed in a solvent.

At the time of producing the polyurethane resin of the present invention by reacting the isocyanate group-terminated polymer with a curing agent in this way, a terminal stopper such as diethylamine, dibutylamine and diethanolamine can be used in combination as a molecular weight adjusting agent for the polyurethane resin. Also, additives such as filler, reinforcing agent, stabilizer, flame retardant, mold release agent, and fungicide described below can be blended.

Examples of the filler and reinforcing agent include carbon black, aluminum hydroxide, calcium carbonate, titaniumoxide, silica, glass, bone meal, wood meal, and fiber flake. Examples of the stabilizer include an antioxidant, an ultraviolet absorber and a light stabilizer. Examples of the flame retardant include chloroalkyl phosphate, dimethylmethyl phosphonate, ammonium polyphosphate, and organic bromine compounds. Examples of the mold release agent include wax, soaps and silicone oil. Examples of the fungicide include pentachlorophenol, pentachlorophenol laurate and bis(tri-n-butyltin)oxide.

By virtue of using the isocyanate group-terminated prepolymer having good storage stability obtained by the manufacturing method of the present invention, the quality stability is ensured and therefore, the polyurethane resin of the present invention is useful for applications requiring low hardness and high strength, for example, useful for a resin molding frame material, various rollers for office equipment, such as paper feed roller, paper discharge roller, transfer roller, development roller, and charging roller, various blades used for screen printing or the like, a seal material, a vibration absorber, and an impact absorber.

Also, for the same reasons as above, a polyurethane resin with low modulus as well as high elongation and high modulus of repulsion elasticity can be produced and therefore, the polyurethane resin of the present invention is useful also for applications such as synthetic leather and spandex.

EXAMPLES

The present invention will be described in greater detail below by referring to Examples and Comparative Examples, but the present invention is not limited to these Examples. Incidentally, Polyol X used in the following is a polyol having a hydroxyl value of 74.7 mgKOH/g and a number average molecular weight (Mn) of 1,500, obtained by addition-polymerizing propyleneoxide (hereinafter, referred to as "PO" as needed) to dipropyleneglycol.

Preparation Example 1

Preparation of Composite Metal Cyanide Complex Catalyst

In a 500-ml flask, 75 g of an aqueous solution containing 4.2 g of potassium hexacyanocobaltate ($K_3[Co(CN)]_6$) was added dropwise to 25 g of an aqueous solution containing 10.2 g of zinc chloride with stirring at 300 rpm over 30 minutes while maintaining the temperature at 40° C. After the completion of dropwise addition, stirring was further performed for 30 minutes, and then a mixture of 80 g of tert-butyl alcohol (hereinafter, referred to as "TBA" as needed), 80 g of water and 0.6 g of Polyol X was added. The system was stirred at 40° C. for 30 minutes and then at 60° C. for 60 minutes, and the resulting solution was filtered under pressure (0.25 MPa) by using a circular filter plate of 125 mm in diameter and a quantitative filter paper for fine particles (No. 5C produced by ADVANTEC), as a result, a solid (cake) containing a composite metal cyanide complex was separated in about 50 minutes. This composite metal cyanide complex is a compound wherein formula (1), $M^1$ is Zn(II), $M^2$ is Co(III), X is Cl, and R is TBA.

Subsequently, a mixture of 36 g of TBA and 84 g of water was added to the cake containing a composite metal cyanide complex above and after stirring for 30 minutes, the solution was filtered under pressure (filtration time: 15 minutes). Furthermore, a mixture of 108 g of TBA and 12 g of water was added to the resulting cake containing a composite metal cyanide complex, and the system was stirred for 30 minutes to obtain TBA Slurry S containing a composite metal cyanide complex.

About 5 g of the obtained TBA Slurry S containing a composite metal cyanide complex was weighed in a flask and after rough drying by nitrogen stream, dried under reduced pressure at 80° C. for 4 hours, and the solid obtained was weighed, as a result, the concentration of the composite metal cyanide complex that is a solid component was 4.53% by mass.

The rest of TBA Slurry S containing a composite metal cyanide complex was mixed with 120 g of Polyol X and after a treatment under reduced pressure at 80° C. for 3 hours and at 115° C. for 3 hours, the volatile components were removed by distillation to obtain Slurry Catalyst Y. The concentration of the composite metal cyanide complex (solid component) in Slurry Catalyst Y was 3.74% by mass.

Example 1

(1) Production of Polyol Composition in 5 L Reactor

A 5-L stainless steel-made pressure-resistant reactor with a stirrer was used as a reactor. Also, Slurry Catalyst Y prepared in Preparation Example 1, Polyol X and propyleneoxide (PO) were used as a DMC catalyst, an initiator and an alkyleneoxide, respectively.

The reactor was charged with 587 g of Polyol X and 5.7 g of Slurry Catalyst Y (0.213 g as the DMC solid catalyst component). After nitrogen purging, the temperature was raised to 120° C., and 59 g of PO was reacted. When the pressure in the system dropped, PO was supplied in a total amount of 2,600 g at 20 g/min for 130 minutes and then in a total amount of 1,300 g at 10 g/min for 130 minutes. During the supply, the inner temperature of the reactor was maintained at 120° C. and the stirring speed was maintained at 220 rpm, whereby PO was entirely reacted.

To the obtained Polyether Polyol Composition P, 45 g of water (about 1.0% by mass) was added and after heating with stirring at 120° C. for 1 hour in a closed system, dehydration/drying under reduced pressure was performed at about 4,000 to about 100 Pa for 2.5 hours while maintaining the temperature of 120° C. to obtain Polyether Polyol Composition A having a water content of 13 ppm by mass.

The properties of Polyol Composition A obtained are shown in Table 1. Incidentally, the hydroxyl value and the degree of total unsaturation were measured by the method in accordance with JIS K1557. The viscosity (kinematic viscosity) was measured at 25° C. by an E-type viscometer. Also, the content of the DMC catalyst residue (deactivated DMC catalyst) based on the final product polyol in the polyol composition was shown by the content of Zn and Co obtained as a result of metal analysis measured by the following method. Incidentally, the initial charge amount of the DMC catalyst in the manufacturing method of the present invention is set by taking this amount of the metal derived from the DMC catalyst based on the final product polyol, as the specified value (from 1 to 30 ppm by mass).

<Metal Analysis of Polyol Composition>

The metal analysis of the polyol composition was performed using an atomic absorption photometer. About 20 g of the polyol composition was weighed in a platinum dish and burned, the residue was dissolved in an aqueous hydrochloric acid solution, and the solution was measured for the emission spectrum. From the measured value of the standard aqueous solution of the expected metal, the metal content in the polyol was determined.

(2) Production of Isocyanate Group-Terminated Prepolymer

A 1-L glass-made reaction tank with a stirring blade was charged with 400 g of Polyether Polyol Composition A obtained in (1) above. Also, the reaction tank was charged with tolylene diisocyanate (an isomer mixture of 2,4-form and 2,6-form, containing 80% by mass of 2,4-form, trade name: TDI-80, produced by Nippon Polyurethane Industry Co., Ltd.) and 4,4'-diphenylmethane diisocyanate (trade name: Millionate MT, produced by Nippon Polyurethane Industry Co., Ltd.) in a molar ratio of 7/3 only in amounts such that the isocyanate group/hydroxyl group (molar ratio) became 1.95 based on Polyether Polyol Composition A. After purging the inside of the reaction tank with nitrogen, the temperature of the reaction tank was raised to 90° C. while stirring the contents at 100 rpm and maintained at 90° C. A part of the contents were sampled every fixed time during the reaction and measured for the content $z_1$ (% by mass) of the isocyanate group, and the isocyanate reaction ratio z (%) to the theoretical isocyanate group content $z_0$ (% by mass) was determined. After confirming that the isocyanate group content $z_1$ (% by mass) became not more than the theoretical isocyanate group content $z_0$ (0.84% by mass), the reaction was terminated to obtain an isocyanate group-terminated prepolymer.

The obtained isocyanate group-terminated prepolymer was subjected to a storage stability test of holding the prepolymer at 80° C. for 24 hours, and storage stability was evaluated by the change in viscosity between before and after the test. Incidentally, the measurement of the viscosity was performed by the same method as the measurement of viscosity of the polyol composition. The results are shown in Table 2.

Example 2

Polyether Polyol Composition B having a water content of 65 ppm by mass was obtained by performing the same operation as in (1) of Example 1 except for changing the amount added of water to 137 g (about 3.0%) and the condition of the dehydration/drying under reduced pressure to 1.5 hours. The properties of Polyol Composition B obtained are shown in Table 1.

An isocyanate group-terminated prepolymer was obtained by performing the same operation as in (2) of Example 1 except for using Polyether Polyol Composition B in place of Polyether Polyol Composition A. The results of a storage stability test performed on the obtained isocyanate group-terminated prepolymer in the same manner as in Example 1 are shown in Table 2.

Example 3

Polyether Polyol Composition C was obtained by performing the same operation as in (1) of Example 1 except that with respect to dehydration/drying under reduced pressure, a dehydration treatment under reduced pressure was performed at about 4,000 to about 300 Pa for 1 hour while maintaining the temperature of 120° C. to adjust the water content in the polyether polyol composition to 200 ppm by mass. The properties of Polyol Composition C obtained are shown in Table 1.

An isocyanate group-terminated prepolymer was obtained by performing the same operation as in (2) of Example 1 except for using Polyether Polyol Composition C in place of Polyether Polyol Composition A. The results of a storage stability test performed on the obtained isocyanate group-terminated prepolymer in the same manner as in Example 1 are shown in Table 2.

Example 4

PO was polymerized in the same manner as in (1) of Example 1 to produce Polyether Polyol Composition P, and after adding 45 g (about 1.0% by mass) of water thereto and introducing a $CO_2$ gas at a partial pressure of 0.1 MPa, the solution was heated with stirring at 120° C. for 2 hours in a closed system. Thereafter, the same operation of dehydration/drying under reduced pressure as in Example 2 was performed to produce Polyether Polyol Composition D containing 58 ppm by mass of water. The properties of Polyol Composition D obtained are shown in Table 1.

An isocyanate group-terminated prepolymer was obtained by performing the same operation as in (2) of Example 1 except for using Polyether Polyol Composition D in place of Polyether Polyol Composition A. The results of a storage stability test performed on the obtained isocyanate group-terminated prepolymer in the same manner as in Example 1 are shown in Table 2.

Example 5

PO was polymerized in the same manner as in (1) of Example 1 to produce Polyether Polyol Composition P, and after adding 45 g (about 1.0% by mass) of water thereto and introducing a $CO_2$ gas at a partial pressure of 0.5 MPa, the solution was heated with stirring at 120° C. for 1 hour in a closed system. The pressurized $CO_2$ gas was released, and the same operation of dehydration/drying under reduced pressure as in Example 2 was performed to produce Polyether Polyol Composition E containing 60 ppm by mass of water. The properties of Polyol Composition E obtained are shown in Table 1.

An isocyanate group-terminated prepolymer was obtained by performing the same operation as in (2) of Example 1 except for using Polyether Polyol Composition E in place of Polyether Polyol Composition A. The results of a storage stability test performed on the obtained isocyanate group-terminated prepolymer in the same manner as in Example 1 are shown in Table 2.

Comparative Example 1

PO was polymerized in the same manner as in (1) of Example 1 to produce Polyether Polyol Composition P, and an isocyanate group-terminated prepolymer was obtained by performing the same operation as in (2) of Example 1 except for using Polyether Polyol Composition P in place of Polyether Polyol Composition A. The results of a storage stability test performed on the obtained isocyanate group-terminated prepolymer in the same manner as in Example 1 are shown in Table 2.

TABLE 1

| Polyol Composition | Production Conditions | | Hydroxyl value (mgKOH/g) | Viscosity at 25° C. (mPa · s) | Degree of Unsaturation (meq./g) | Catalyst Residue (ppm) | Water Content (ppm) |
| --- | --- | --- | --- | --- | --- | --- | --- |
| | Water Treatment Conditions | $CO_2$ | | | | | |
| A | 1%, 120° C., 1 Hr | none | 11.4 | 4,700 | 0.0072 | 13.9 | 13 |
| B | 3%, 120° C., 1 Hr | none | 11.3 | 4,650 | 0.0070 | 13.5 | 65 |
| C | 1%, 120° C., 1 Hr | none | 11.2 | 4,610 | 0.0071 | 13.8 | 200 |
| D | 1%, 120° C., 2 Hr | 0.1 MPa | 11.1 | 4,540 | 0.0072 | 14.2 | 58 |
| E | 1%, 120° C., 1 Hr | 0.5 MPa | 11.2 | 4,670 | 0.0069 | 14.4 | 60 |

TABLE 2

| Example | Raw Material Polyol Composition | Viscosity Before Storage Stability Test; (V1) [mPa · s] | Viscosity After Holding at 80° C. for 24 Hours; (V2) [mPa · s] | Percent of Viscosity Increase (%) ((V2 − V1)/V1) × 100 |
| --- | --- | --- | --- | --- |
| 1 | A | 56,700 | 63,600 | 12.2 |
| 2 | B | 55,300 | 61,600 | 11.4 |
| 3 | C | 61,300 | 68,300 | 11.4 |
| 4 | D | 51,000 | 57,800 | 13.3 |
| 5 | E | 49,500 | 53,400 | 7.9 |
| Comparative Example 1 | P | 73,300 | 94,700 | 29.2 |

Table 2 reveals that in the isocyanate group-terminated prepolymers of Examples 1 to 5 obtained by the manufacturing method of the present invention, specifically, in the isocyanate group-terminated prepolymers of Examples 1 to 5 obtained using Polyether Polyol Compositions A to E containing a deactivated DMC catalyst subjected to a treatment with water and heat or a treatment with water, $CO_2$ and heat, the viscosity of the prepolymer is low and storage stability is high. The polyisocyanate group-terminated prepolymer of Comparative Example is one obtained using Polyether Polyol Composition P not subjected to the treatment above, and the viscosity thereof is increased by the storage stability test, revealing that storage stability is poor.

While the present invention has been described in detail and with reference to specific embodiments thereof, it will be apparent to one skilled in the art that various changes and modifications can be made therein without departing from the spirit and scope of the invention.

This application is based on Japanese Patent Application No. 2009-226162 filed on Sep. 30, 2009, the contents of which are incorporated herein by way of reference.

The invention claimed is:

1. A method for manufacturing an isocyanate group-terminated prepolymer, comprising:
   (a) performing a ring-opening polymerization of an alkyleneoxide-containing cyclic compound by using an initiator in a presence of a composite metal cyanide complex catalyst in such an amount that an amount of a metal derived from the composite metal cyanide complex catalyst becomes from 1 to 30 ppm by mass based on a polyol obtained by the ring-opening polymerization, thereby obtaining a polyol composition comprising the polyol and the composite metal cyanide complex catalyst;
   (b) adding water in an amount of 0.05 to 20% by mass based on the polyol composition to the polyol composition from which the composite metal cyanide complex catalyst has not been removed and performing a heat treatment of the polyol composition comprising the water in a closed system;
   (c) subjecting the polyol composition after the heat treatment to a dehydration treatment until a water content in the polyol composition becomes from 5 to 500 ppm by mass; and
   (d) adding a polyisocyanate compound to the polyol composition after the dehydration treatment such that the polyisocyanate compound reacts with the polyol in the polyol composition,
   wherein the performing of the heat treatment comprises contacting carbon dioxide with the polyol composition such that a partial pressure of the carbon dioxide is from 0.01 to 5 MPa.

2. The manufacturing method according to claim 1, wherein the composite metal cyanide complex catalyst comprises, as an organic ligand, one or more compounds selected from the group consisting of tert-butyl alcohol, tert-pentyl alcohol and ethylene glycol mono-tert-butyl ether.

3. The manufacturing method according to claim 1, wherein the heat treatment is performed such that the partial pressure of the carbon dioxide is from 0.05 to 2 MPa.

4. The manufacturing method according to claim 1, wherein the heat treatment is performed such that the partial pressure of the carbon dioxide is from 0.1 to 1 MPa.

5. The manufacturing method according to claim 1, wherein the water is added in an amount of 0.1 to 5% by mass based on the polyol composition.

6. The manufacturing method according to claim 1, wherein the water is added in an amount of 0.5 to 3% by mass based on the polyol composition.

7. The manufacturing method according to claim 1, wherein the heat treatment is performed at a temperature of from 50 to 140° C.

8. The manufacturing method according to claim 1, wherein the heat treatment is performed at a temperature of from 80 to 100° C.

9. The manufacturing method according to claim 8, wherein the heat treatment is performed for 1 to 3 hours while the polyol composition is stirred.

10. The manufacturing method according to claim 1, wherein the dehydration treatment is performed until the water content in the polyol composition becomes from 10 to 150 ppm by mass.

11. The manufacturing method according to claim 1, wherein the ring-opening polymerization is performed in the presence of the composite metal cyanide complex catalyst in such an amount that the amount of a metal derived from the composite metal cyanide complex catalyst becomes from 3 to 15 ppm by mass based on the polyol obtained by the ring-opening polymerization.

12. An isocyanate group-terminated prepolymer obtained by the manufacturing method according to claim 1.

13. A polyurethane resin obtained by a process comprising reacting the isocyanate group-terminated prepolymer according to claim 12 with a curing agent.

* * * * *